United States Patent [19]

Bernardin

[11] Patent Number: 4,487,430
[45] Date of Patent: Dec. 11, 1984

[54] FOLD AND HOLD ANSWER BOOK

[76] Inventor: Sarah A. Bernardin, 1518 Brooklyn, Ann Arbor, Mich. 48104

[21] Appl. No.: 344,026

[22] Filed: Jan. 29, 1982

[51] Int. Cl.³ .............................................. B42D 21/02
[52] U.S. Cl. ...................................... 281/29; 283/38; 283/58
[58] Field of Search ...................... 281/18, 29; 283/38, 283/58; 434/96, 97

[56] References Cited

U.S. PATENT DOCUMENTS

| 1,304,773 | 5/1919 | Howell | 434/97 X |
| 3,254,906 | 6/1966 | Moss | 283/58 X |
| 4,332,400 | 6/1982 | Hayman | 283/58 X |

FOREIGN PATENT DOCUMENTS

| 649363 | 8/1937 | Fed. Rep. of Germany | 283/38 |
| 829121 | 1/1952 | Fed. Rep. of Germany | 434/97 |
| 603372 | 8/1978 | Switzerland | 283/38 |
| 19906 | of 1912 | United Kingdom | 283/38 |

*Primary Examiner*—Paul A. Bell
*Attorney, Agent, or Firm*—Harness, Dickey & Pierce

[57] ABSTRACT

This disclosure provides a mechanical embodiment for a question and answer book. The current invention provides for a question posed by the story in the book to be answered by a mechanical manipulation of the book pages.

1 Claim, 5 Drawing Figures

FOLD AND HOLD ANSWER BOOK

BACKGROUND AND SUMMARY OF THE INVENTION

It is previously known to produce a book composed of segmented pages in which, for example, each page shows a different figure and where the segments contain interchangeable parts of the body (such as head, abdomen, and legs) and a corresponding story or interchangeable characters and portions of a story. These books leave combining and recombining of page segments to the complete discretion of the reader.

In accordance with the present invention, a book is provided in which segmented pages may either be manipulated at the reader's discretion or preferrably by mechanical means in a manner desired by the author thereby producing a composite answer to a question posed by the story in the book.

Accordingly, one object of the current invention is that the book title poses a question which is discussed within the book and answered by proper manipulation of segmented pages.

It is a further object of this invention that the book provide mechanical means to aid in manipulation of the pages and thereby show the answer.

Still another object of the invention is that said manipulation of the book pages provides a composite pictoral answer to said question.

Additional advantages and features of the present invention will become apparent from a reading of the following description taken in conjunction with the accompanying drawings.

DESCRIPTION OF THE PREFERRED EMBODIMENTS

Figure 1:
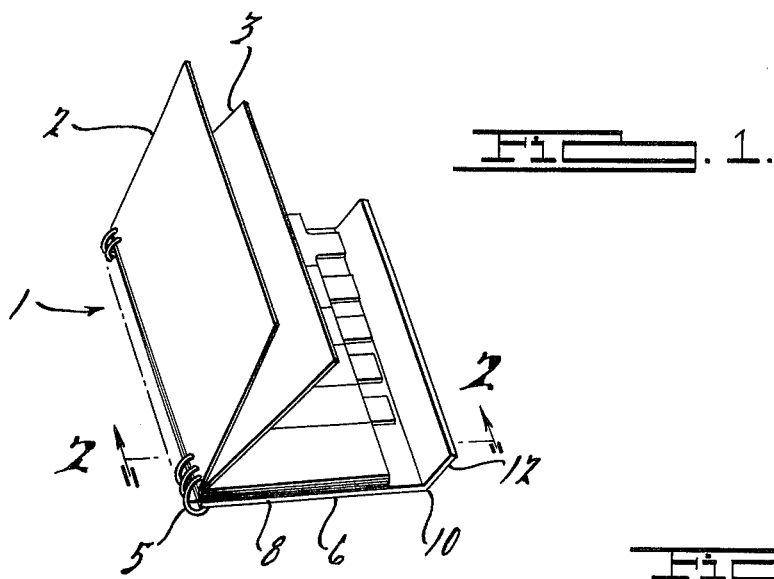
FIG. 1 is a perspective view of a preferred embodiment of the present invention with a cover and page one partially open.
Figure 3:
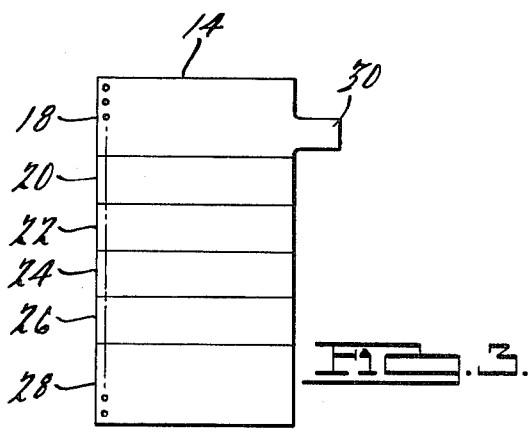
FIG. 3 is a top view of one segmented page.
Figure 4:
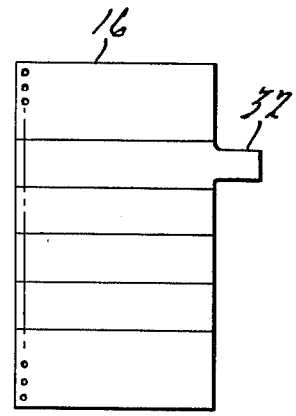
FIG. 4 is a top view of a second segmented page.

Referring now to the drawings, wherein the showings are made for the purpose of illustrating a preferred embodiment of the present invention only and are not for the purpose of limiting the invention, FIG. 1 shows a fold and hold answer book 1, having a front cover 2, a first inside page 3, a back cover 6, and a binding means 5. Back cover 6 includes a back cover page 8, a hinge means 10 and a flap 12. Typical interior pages 14 and 16 are shown in FIGS. 3 and 4 respectively. Each page is segmented into six (6) equal parts 18, 20, 22, 24, 26 and 28. Each segmented page contains at least one segment 18 having a tab 30 of extended length and will be described in greater detail later.

Front cover 2 presents a title that states a question posed by the book, or suggests what the question will concern and includes an illustration pertaining to the subject of book 1. First inside page 3, which is not segmented, states the subject of book 1 and poses a specific question that will be answered. It is further contemplated that an identical page will be inserted as a last inside page, adjacent to back cover 6.

Figure 2:
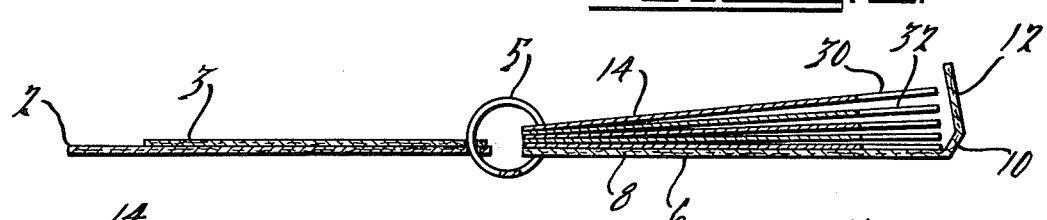
FIG. 2 is a view along the line 2—2 of FIG. 1.
Figure 5:
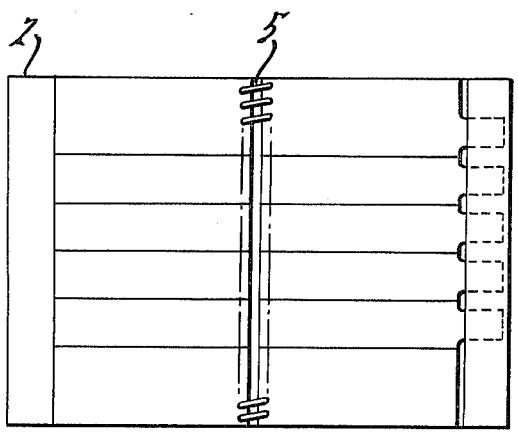
FIG. 5 is a top view of the present invention with a flap positioned over tabbed page segments.

The hinge means 10 of back cover 6 allows flap 12 to pivot about an axis formed by hinge 10 and cover tabbed segments of individual pages as can be seen in FIGS. 2 and 5. It is further contemplated that hinge means 10 and flap 12 may alternatively be positioned on front cover 2.

The body of book 1 is a plurality of segmented pages as illustrated by typical pages 14 and 16 shown in FIGS. 3 and 4 respectively. Top segment 18, is used to show the uppermost front portion of a figure on the front and the corresponding back portion of a figure on the back. Five segments 18, 20, 22, 24 and 26 are used in illustrating a figure both front and back and are divided as follows: top of head and/or hat; face and neck; chest and arms; hips and thighs; calf and feet or shoes. One segment 28 contains a written story. Each illustrated segmented page and portion of the story takes a step toward answering the question posed by book 1.

Each segmented page further contains one segment 18 with a tab 30 that extends beyond the edge of other segments and pages. On successive pages, the tabs are placed such that the first or top segment on the first segmented page has a tab, the second or second from the top segment on the second segmented page has a tab, etc. as illustrated by page 16 and tab 32 in FIG. 4. The sixth segment 28 containing the story does not have a tab. Thus, there are five tabs. Back cover page 8 states that perhaps there is an answer to the question in the book and provides instructions such that a composite picture answering the stated question is formed by folding over flap 12 on the back cover in order to restrain the tabbed segments as can be seen in FIG. 5.

EXAMPLE

The cover 2 as shown in FIG. 1 contains the title, "Is there a Santa Claus?" The first inside page 3 of book 1 as shown in FIG. 1 contains an illustration and poses the question—"Who is it that leaves those presents for me under the brightly lit Christmas tree?"

Each succeeding page of the book is then segmented and contains a drawing of a member of the family, such as:

1st Segmented page: Sister Anne
2nd Segmented page: Grandpa
3rd Segmented page: Father
4th Segmented page: Brother Doug
5th Segmented page: Mother The segmented pages each contain a verse pertaining to the individual pictured and is complete with front and rear view. In this example, one segment of each page contains a tab such that when the restraining flap is used to hold the tabs and the book reopened, an illustration of Santa Claus appears using one segment from each of the previously described pages and answering the original question.

While the above description constitutes the preferred embodiment of the present invention, it should be appreciated that the following variations, modifications or changes are contemplated as alternative embodiments.

(1) Although it is contemplated that each page contain at least two segments, the number of segments and where divided is arbitrary.

(2) One large book containing a series of fold and hold books 1.

(3) Segment 28, containing written material could have a tab.

It should also be appreciated that the invention is susceptible to further modification, variation and change without departing from the proper scope or fair meaning of the accompanying claims.

We claim:

1. A question and answer book comprising:
a front cover,
a back cover,
binding means connecting spaced parallel edges of said front and back covers for relative folding movement about a first fold axis,
a plurality of individual book page segments interposed between said front and back covers and each secured along one edge thereof to said binding means for relative folding movement about said first fold axis,
said book page segments consisting of a first group of segments having tabs thereon and a second group of segments without tabs thereon,
said tab on each of said first group of page segments extending a predetermined lateral distance from the edges of said page segment opposite said edge thereof secured to said binding means,
a flap hingedly attached to the edge of one of said book covers opposite the edge thereof connected to said binding means,
said flap being foldable about a second fold axis arranged parallel to said first fold axis and spaced laterally therefrom a distance greater than the sum of the dimensions of the lateral width of said page segments plus said predetermined lateral distance,
said flap being foldable along said second fold axis between a first position generally coplanar with said one book cover so as to not restrain folding movement of either said first or second groups of page segments relative to said one book cover; said flap being foldable to a second position arranged generally parallel to said one book cover so as to overlie said tabs and thereby restrain said first group of page segments from folding movement relative to said one book cover, but permitting folding movement of said second group of page segments relative to said one book cover, whereby said second group of page segments restrained by moving said flap to said second position cooperating to form a visual impression forming an answer responding to a question posed within said book.

* * * * *